(12) United States Patent
Fry (10) Patent No.: US 6,757,523 B2
(45) Date of Patent: Jun. 29, 2004

(54) CONFIGURATION OF TRANSMIT/RECEIVE SWITCHING IN A TRANSCEIVER

(75) Inventor: Terry L. Fry, Davidsonville, MD (US)

(73) Assignee: Zeus Wireless, Inc., Columbia, MD (US)

( * ) Notice: Subject to any disclaimer, the term of this patent is extended or adjusted under 35 U.S.C. 154(b) by 469 days.

(21) Appl. No.: 09/739,569

(22) Filed: Dec. 18, 2000

(65) Prior Publication Data

US 2003/0190931 A1 Oct. 9, 2003

Related U.S. Application Data

(60) Provisional application No. 60/193,933, filed on Mar. 31, 2000.

(51) Int. Cl.[7] ................................................. H04B 1/44
(52) U.S. Cl. .............................. 455/78; 455/80; 455/73; 333/103
(58) Field of Search ............................. 455/73, 78, 79, 455/80, 82, 83, 84; 333/104, 103, 100, 101; 330/134

(56) References Cited

U.S. PATENT DOCUMENTS

| | | | | |
|---|---|---|---|---|
| 4,637,073 A | * | 1/1987 | Selin et al. ................. | 455/78 |
| 4,810,980 A | * | 3/1989 | Heston et al. .............. | 455/80 |
| 5,289,142 A | * | 2/1994 | Upton ........................ | 333/103 |
| 5,485,130 A | * | 1/1996 | Nakahara et al. ........... | 333/104 |
| 5,548,239 A | * | 8/1996 | Kohama ..................... | 455/82 |
| 6,104,240 A | * | 8/2000 | Fujimoto et al. ........... | 333/104 |

* cited by examiner

Primary Examiner—Quochien B. Vuong
Assistant Examiner—Lana Le
(74) Attorney, Agent, or Firm—Hamilton, Brook, Smith & Reynolds, P.C.

(57) ABSTRACT

An economical, compact wireless data telemetry transceiver is adapted to establish and maintain communication links at 2.4 GHZ. The wireless transceiver includes RF and computer control components in a compact package approximately the size of a deck of cards and is adapted to be built into original equipment manufacturer (OEM) products to support a wide range of wireless data telemetry applications. Each transceiver includes a shielded RF board or module with a frequency hopping transmitter and receiver, an antenna, and a digital control board or module. The transceiver functions as a half duplex, bi-directional communication device; transmit and receive functions are time interleaved in a non-overlapping fashion. The RF Board consists of a transmitter, receiver, frequency synthesizer and T/R Switch, each controlled by an external microprocessor to either transmit serial data or receive serial data.

27 Claims, 9 Drawing Sheets

CONFIGURATION OF TRANSMIT/RECEIVE SWITCHING IN A TRANSCEIVER

RELATED APPLICATION INFORMATION

The instant non-provisional patent application claims benefit of copending provisional patent application number 60/193,933, entitled Configuration of Transmit/Receive Switching and filed Mar. 31, 2000, the entire disclosure of which is incorporated herein by reference.

BACKGROUND OF THE INVENTION

1. Field of the Invention

The present invention relates to economical collection and transmission of data via wireless data telemetry utilizing a plurality of transceivers, each preferably configured with single antenna.

2. Discussion of the Prior Art

Infrared and radio frequency (RF) data transmission methods are the principal wireless communication technologies described in the prior art. Infrared beam communications systems cannot operate over distances of more than a few feet and so are limited to applications such as bar code scanning and television (or other home appliance) remote control.

As a result, most of the prior art wireless data transmission products utilize standard RF technology, i.e., radios, the same technology used in vehicle dispatch and police communication systems. Standard RF products are relatively simple and inexpensive to build, but for operation FCC licenses may be required. RF transmissions are susceptible to interference from a growing number of sources and to interception by readily available eavesdropping equipment. The unreliable quality of standard RF transmissions makes the technology unsuitable for applications where all of the information transmitted must be accurate, complete, and secure.

In order to overcome the shortcomings of standard RF transmission methods, direct sequence spread spectrum (DSSS) was developed. DSSS radios divide or slice transmissions into small bits, thereby spreading energy from the bits simultaneously across a wide spectrum of radio frequencies. DSSS is a relatively unreliable transmission medium, however, because spreading the message across a wide spectrum greatly reduces the strength of the radio signal carrying the message on any one frequency. Since a DSSS receiver must simultaneously monitor the entire allotted spectrum, severe interference from a high energy RF source within the monitored spectrum can pose an insurmountable problem. DSSS performance also degrades quickly in shared-service environments having multiple radio systems operating simultaneously.

Frequency hopping spread spectrum (FHSS) technology was developed by the U.S. military to prevent interference with or interception of radio transmissions on the battle field and is employed by the military in situations where reliability and speed are critical. Standard RF and DSSS cannot match the reliability and security provided by frequency hopping. Instead of spreading (and therefore diluting) the signal carrying each bit across an allotted spectrum, as in DSSS, frequency hopping radios concentrate full power into a very narrow spectral width and randomly hop from one frequency to another in a sequence within a defined band, up to several hundred times per second. Each FHSS transmitter and receiver coordinate the hopping sequence by means of an algorithm exchanged and updated by both transmitter and receiver on every hop. Upon encountering interference on a particular frequency, the transmitter and receiver retain the affected data, randomly hop to another point in the spectrum and then continue the transmission. There should always be frequencies somewhere in the spectrum that are free of interference, since neither benign producers of interference or hostile jammers will likely interfere with all frequencies simultaneously and at high power radiation levels, and so the frequency hopping transmitter and receiver will find frequencies with no interference and complete the transmission. This ability to avoid interference enables FHSS radios to perform more reliably over longer ranges than standard RF or DSSS radios. In the prior art, frequency hopping FHSS communication systems have been used almost exclusively in the extremely expensive robust military or government communication systems.

Generally speaking, data telemetry is the transmission of short packets of information from equipment or sensors to a recorder or central control unit. The data packets are transferred as electric signals via wire, infrared or RF technologies and data is received at a central control unit such as a computer with software for automatically polling and controlling the remote devices. The control unit analyzes, aggregates, archives and distributes the collected data packets to other locations, as desired, via a local area network (LAN) and/or a wide area network (WAN). Wireless data telemetry provides several advantages over data telemetry on wired networks. First, wireless systems are easier and less expensive to install; second, maintenance costs are lower; third, operations can be reconfigured or relocated very quickly without consideration for rerunning wires, and fourth, wireless telemetry offers improved mobility during use.

The Federal Communications Commission (FCC) has designated three license-free bandwidth segments of the radio frequency spectrum and made them available for industrial, scientific and medical (ISM) use in the United States. These three segments are 900 MHZ, 2.4 GHz and 5.8 GHz. Anyone may operate a wireless network in a license-free band without site licenses or carrier fees and is subject only to a radiated power restriction (i.e., a maximum of one watt radiated power). The radio signals transmitted must be spread spectrum. Foreign national spectrum regulation organizations and international telecommunications bodies have also agreed to recognize a common license-free ISM frequency at 2.4 GHz, and so a defacto international standard for license-free ISM communications has emerged. The ISM band at 2.4 GHz provides more than twice the bandwidth capacity and is subject to far less congestion and interference than the ISM band at 900 MHZ. Several industrial nations do not permit a license-free ISM band at 900 MHZ and relatively few nations have a license-free ISM band at 5.8 Ghz, but the United States, Europe, Latin America and many Asian countries have adopted an ISM band at 2.4 GHz.

Not just any wireless telemetry system will do for many applications, however. The realities of the marketplace dictate that data telemetry cannot be the most expensive part of a system having commercial application. For example, if a retail point-of-sale cash register is to be configured with a wireless data telemetry radio; the radio cannot be more expensive than the cash register. In many commercial applications, buyers have fixed expectations for what things cost and new features, however useful, cannot substantially exceed those expectations. Thus, it would be best if the wireless data telemetry radio were free. In the interest of providing the most economical wireless data telemetry radio, a transceiver with a shared antenna for both transmit and receive segments is suggested, but how is the switching between transmit function and receive function to be accomplished? The off-the-shelf transmit/receive (T/R) switches are expensive, have a high parts count, and are often configured such that the components within the switch dissipate transmitter energy when in the receive state, adding heat and raising the energy required to operate the wireless data telemetry transceiver. Use of off-the-shelf T/R switch components, as is customary in the prior art, make it difficult to provide a wireless data telemetry radio that is small, light, resistant to interference from adjacent RF noise sources, and uses as little energy as possible.

What is needed, then, is an inexpensive, easy to use and robust data telemetry and communication system including an inexpensive and compact transceiver, preferably operating in the common license-free ISM frequency band, and providing reliable communications for a variety of users in commercial and industrial environments.

OBJECTS AND SUMMARY OF THE INVENTION

Accordingly, it is a primary object of the present invention to overcome the above mentioned difficulties by providing an economical, compact wireless data telemetry transceiver is adapted to establish and maintain communication links in the license-free ISM frequency band at 2.4 GHz.

Another object of the present invention is to efficiently switch between the transmit and receive functions in a transceiver, while dissipating as little transmitter power as possible when in the receive state.

Yet another object of the present invention is to implement an economical and reliable transmit/receive switch with the smallest possible parts count.

Still another object of the present invention is to implement a transmit/receive switch with inexpensive parts.

The aforesaid objects are achieved individually and in combination, and it is not intended that the present invention be construed as requiring two or more of the objects to be combined unless expressly required by the claims attached hereto.

In accordance with the present invention, an economical, compact wireless data telemetry transceiver is adapted to establish and maintain communication links at 2.4 GHz in the license-free ISM frequency band and preferably provides a good balance between data rate and range, for example, providing 9.6 kilobits per second (9.6 Kbps) data transmission over an outdoor line of sight range of approximately 35 thousand meters.

The communication system of the present invention includes components ideally suited to specific wireless data telemetry applications. A transceiver is configured as a printed circuit card having an edge connector. The wireless transceiver includes RF and computer control components in a compact package approximately the size of a deck of cards and is adapted to be built into original equipment manufacturer (OEM) products to support a wide range of wireless data telemetry applications. Each transceiver includes a shielded RF board or module with a frequency hopping transmitter and receiver, an antenna, and a digital control board or module. The digital control module performs RF module and application interface management and an application interface is included to communicate with specific OEM products utilizing serial transistor/transistor logic (TTL) or other standard interfaces. The transceiver operates in the license-free portion of the FCC designated ISM frequency band at 2.4 GHz; as noted above, one embodiment of the transceiver transmits and receives data at 9.6 Kbps at ranges of up to 1500 feet when used indoors with the integrally housed antenna, or up to 12 miles line of sight when used outdoors with an optional directional antenna. The transceiver transmits or receives on any of 550 independent, non-interfering frequencies. When using the transceiver, a data telemetry network can readily be configured for either point-to-point (e.g. wire replacement) or host-to-multipoint networks linked to a user's existing computer or to telephone networks via a system gateway. Optionally, up to 5 collocated independent networks may operate simultaneously, and data security is provided by rapid and random frequency changes (i.e., frequency hopping); the transceiver can optionally be used with data encryption software for providing secure, coded transmissions.

Alternatively, a connector transceiver can be attached to a computer or other device using a standard serial (RS232) port. The connector duplicates the functions of the transceiver but is housed in an enclosure having a cord terminated with an RS232 compatible connector. The connector can therefore be used with a wide variety of existing products such as cash registers, ATM machines, laptop computers or any other computer controlled device having an RS232 port and capable of utilizing the frequency hopping spread spectrum communication system software described in the attached appendices.

A plurality of optional antennas can be used with either the transceiver or the long range connector. The standard antenna included with either the long range connector or the long range transceiver is an omni-directional antenna having vertical polarization and a spherical radiation pattern, is built into the transceiver or connector housings and does not require an added cable.

The transceiver functions as a half duplex, bi-directional communication device; preferably, transmit and receive functions are time interleaved in a non-overlapping fashion, consistent with the requirements of a frequency hopping radio. The transmit interval is restricted to less than 0.4 seconds. In the course of a normal information exchange, a given transmission is generated on a frequency selected from a set of all available hop frequencies. The transmission is limited in duration to the availability of incoming data, and following the transmission, the radio switches to a receive mode and processes any incoming data. Once reception is complete, the transmit interval/receive interval cycle is restarted on a new frequency selected from the hop frequency set. Transmit receive cycling continues until all 75 unique frequencies in the set have been used, whereupon the frequency selection process reenters the top of the table and begins reusing the same 75 frequencies.

Transmitted data is directly modulated onto a synthesized carrier by use of minimum shift keying (MSK) modulation. The receiver is a dual conversion super heterodyne, down converting the received signal first to a 315 MHZ intermediate frequency (IF) signal and then down converting a second time to a 10.7 MHZ IF signal. Demodulation is accomplished using a limiter/discriminator circuit and the demodulated data is recovered from the demodulator output by processing through a comparator. First and second local oscillators (LOs) are controlled in frequency by use of a single loop indirect frequency synthesis. Samples of both first and second voltage controlled oscillators (VCOs) are divided down using phase-locked loop integrated circuit elements, where each sample is compared to an onboard 8 MHZ crystal reference oscillator. During the transmit interval, a single transmitter VCO is controlled by the same device and in the same manner.

To minimize total power consumption within the transceiver, portions of circuitry not in use during either the transmit or receive intervals are disabled under control of the system controller.

The RF Board consists of a transmitter, receiver, frequency synthesizer and T/R Switch. Each of these sections is controlled by an external microprocessor to either transmit serial data or receive serial data. The basic transmitted signal is generated by a voltage-controlled-oscillator (VCO) that operates in the 2.4 to 2.4835 GHz frequency band. The signal is then amplified by three stages of amplification. All three amplification stages and the VCO are switched ON for transmit and switched OFF for receive. A power amplifier stage provides 26 dBm of output power to drive the antenna. This stage also uses a GaAs RF Power FET and a similar power control circuit. The transmitted signal passes through the T/R switch and a 2.44 GHz 4-pole bandpass filter to the antenna. Both the T/R switch and the bandpass filter are implemented using strip line on a separate daughter board.

The receiver uses dual conversion with a first IF of 315 MHZ and a second IF of 10.7 MHZ. The received signal from the antenna passes through the same 2.44 GHz filter the transmitted signal passed through and then passes through the T/R switch to the LNA.

The analog serial data stream is digitized by thresholding the signal using a comparator and a threshold generated from a peak follower. The peak follower follows both the positive and negative peaks of the analog serial data stream and then generates a threshold signal that is half way between the two peaks. The output of the comparator is the digital received signal output to the digital board.

The RF Board includes an I/O Interface which consists of two mechanical connections. Most of the connections are made via a 20 pin dual in-line header. The other connection is for the antenna and is a microstrip pad and ground connection to which the coaxial antenna cable is soldered. TTL-compatible input signals on the Rx/Tx-pin are used to control the T/R switch. A logic high on this pin puts the T/R switch in the receive position and a logic low puts it in the transmit position. Before the radio switches from receive mode (Rx) to transmit mode (Tx), the T/R switch should be put in the Tx position. When switching from Tx to Rx the T/R switch should remain in the Tx position until after the radio is switched from Tx to Rx.

The RF Board includes an RF I/O connection. When data is presented to the serial port of the digital board, firmware on the digital board will cause the radio to hop on 75 frequencies in the 2400–2483.5 MHz band. The dwell time for each hop is 31.6 ms. During a single hop the carrier is frequency modulated with the transmit serial data stream from the digital board. Immediately after the transmit time period the radio switches to the receive mode.

The novel transmit/receive (T/R) switch of the present invention is located on the RF board; preferably, two P-Intrinsic-N (PIN) diodes are used to implement the switching functions. Neither of the PIN diodes is in the transmit power path, so the raw transmitter power doesn't actually flow through either PIN diode, and when no energy is applied to either diode, the T/R switch is correctly applied to one of its two states or positions, and so, in effect, the T/R switch is a single pull, double throw implementation of a classic transmit/receive switch, connected with the antenna. In the first state, the PIN diodes are turned on, the transmitter is connected to the antenna port and the receive port is short circuited, but connected via a quarter wavelength long transmission line segment, so electrically, it appears the receive port is an open circuit. In the second state, the PIN diodes are turned off, the receiver is connected to the antenna port and the transmitter port is effectively short circuited.

The T/R switch is fabricated using electrically controlled transmission line lengths (e.g., in either a strip line or microstrip matrix) that are controlled in electrical length by selective shorting or grounding the transmission line matrix at selected points along the transmission line segments.

The T/R switch is also configurable as separable "RF out" and "RF in" components which can be individually actuated via a selectively controllable bias line. Multiple "RF out" and "RF in" components can be configured into a Multiport RF hub connectable to an antenna or another common port, to permit selection of energy flow direction out of or into selected "RF out" or "RF in" ports.

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components.

DESCRIPTION OF THE PREFERRED EMBODIMENT

Figure 1:
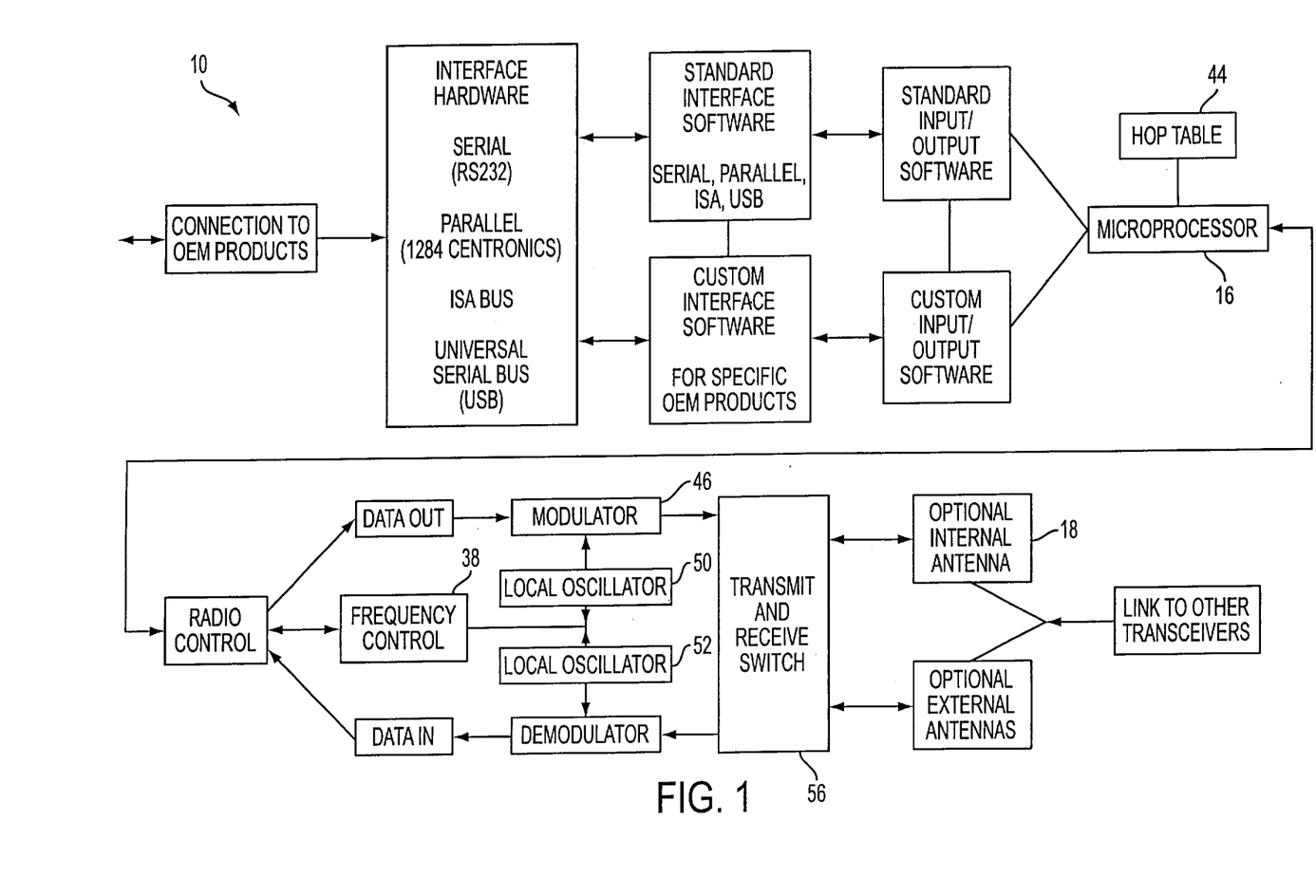
FIG. 1 is a block diagram of a frequency hopping spread spectrum transceiver, in accordance with the present invention.
Figure 2:
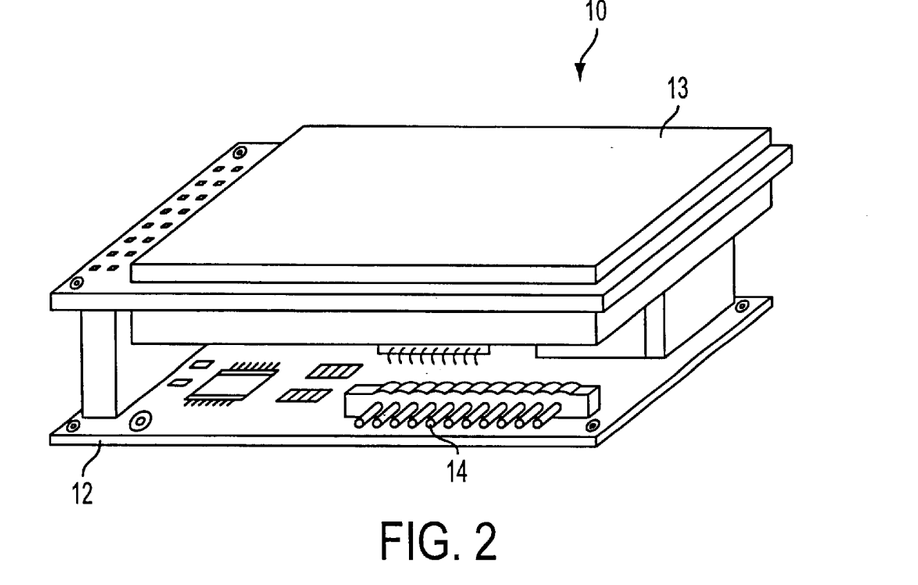
FIG. 2 is a perspective view of the transceiver of FIG. 1, in accordance with the present invention.

In accordance with the present invention, a frequency hopping spread spectrum communication transceiver 10 is adapted to dynamically establish and maintain communication links and includes components ideally suited to wireless data telemetry applications. As shown in FIGS. 1 and 2, transceiver 10 is configured as a stacked pair of printed circuit cards including a digital board 12 connected to a shielded RF board 13, the digital board carries a multi-pin connector 14. Transceiver 10 includes RF and computer control components in a compact package approximately the size of a deck of cards and is adapted to be built into original equipment manufacturer (OEM) products to support a wide range of wireless data telemetry applications. Each long range transceiver 10 includes a shielded RF board or module with a frequency hopping transmitter and receiver, an antenna, and a digital control board or module. The digital control module micro processing unit (MPU) 16 performs RF module and application interface management and an application interface is included to communicate with specific OEM products utilizing serial (transistor/transistor logic, TTL) or other standard interfaces. Transceiver 10 operates in the license-free portion of the FCC designated ISM frequency band at 2.4 GHZ, preferably transmitting and receiving data at 9.6 Kbps at ranges of up to 1500 feet when used indoors with the integrally housed antenna 18, or up to 12 miles line of sight when used outdoors with an optional directional antenna. Transceiver 10 transmits or receives on any of 550 independent, non-interfering frequencies. When using transceiver 10, a data telemetry network can readily be configured for either point-to-point (e.g. wire replacement) or host-to-multipoint networks linked to a user's existing computer or to telephone networks via a system gateway. Optionally, up to 5 collocated independent networks may operate simultaneously, and data security is provided by rapid and random frequency changes (i.e., frequency hopping); transceiver 10 can optionally be used with data encryption software for providing secure, coded transmissions.

Figure 3:
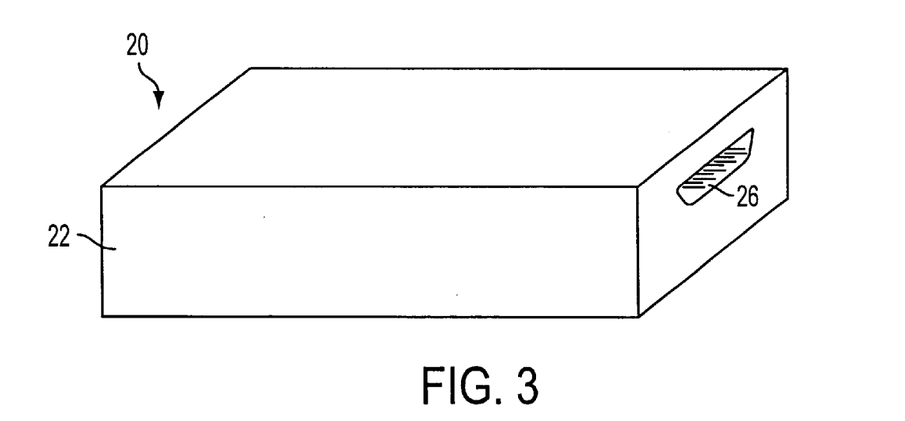
FIG. 3 is a perspective view of a long range connector, in accordance with the present invention.

Alternatively, a long range connector transceiver 20 as shown in FIG. 3 can be attached to a computer or other device using a standard serial (RS232) port. The long range connector 20 duplicates the functions of the long range transceiver of FIGS. 1 and 2 but is housed in an enclosure 22 having an RS232 compatible connector 26. The long range connector 20 can therefore be used with a wide variety of existing products such as cash registers, ATM machines, laptop computers or any other computer controlled device having an RS232 port and capable of utilizing a frequency hopping spread spectrum communication system software package used to configure a user's or vendor's particular system.

Figure 4A:
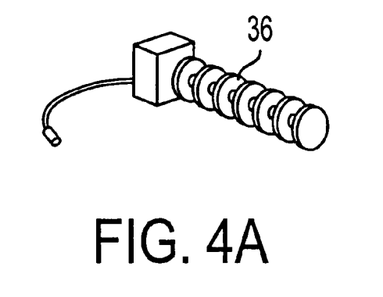
FIG. 4a is a perspective view of a high gain directional antenna adapted for use with the transceiver of FIG. 1, in accordance with the present invention.
Figure 4B:
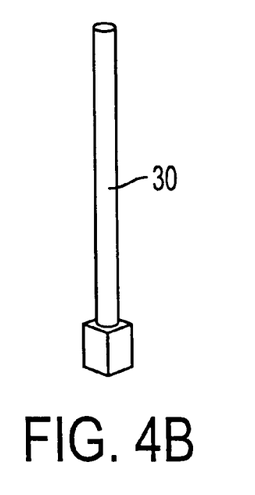
FIG. 4b is a perspective view of an omni-directional antenna adapted for use with the transceiver of FIG. 1, in accordance with the present invention.
Figure 4C:
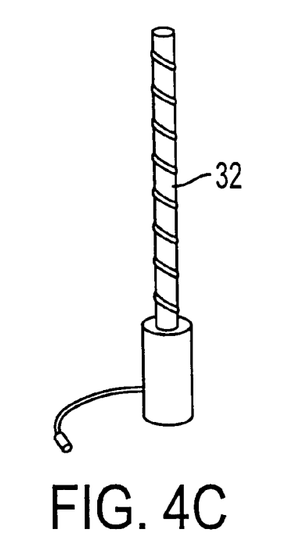
FIG. 4c is a perspective view of a larger omni-directional antenna adapted for use with the transceiver of FIG. 1, in accordance with the present invention.
Figure 4D:
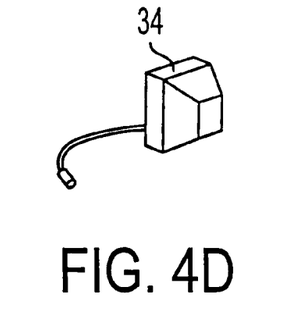
FIG. 4d is a perspective view of a directional antenna adapted for use with the transceiver of FIG. 1, in accordance with the present invention.

As best seen in FIGS. 4a–4d, a plurality of optional antennas can be used with either transceiver 10 of FIG. 2 or the long range connector 20 of FIG. 3. In particular, the four inch high mast antenna 30 of FIG. 4b provides moderately enhanced performance and an omnidirectional pattern; the 28 inch high phased array antenna 32 of FIG. 4c provides substantially improved performance in all horizontal directions. The 6 inch flat square panel antenna 34 of FIG. 4d provides substantially improved performance in a single direction, and the 30 inch long tube antenna 36 of FIG. 4a provides dramatically improved performance in a single direction by providing a highly directional beam width. The standard antenna 18 included with either the long range connector 20 of FIG. 3 or the long range transceiver 10 of FIG. 2 is an omni-directional antenna having vertical polarization and a spherical radiation pattern. Standard antenna 18 is built into transceiver 10 or connector housing 22 and does not require an added cable. The four optional antennas of FIGS. 4a–4d are adapted to be connected using selected cable links or connectors, as required for a specific application.

Transceiver 10 functions as a half duplex, bi-directional communication device over the air. The transmit and receive functions are time interleaved in a non-overlapping fashion, consistent with the requirements of a frequency hopping radio. The transmit interval is restricted to less than 0.4 seconds on any particular frequency within a thirty second interval. In the course of a normal information exchange, a given transmission is generated on a frequency selected from a set of all available hop frequencies stored in hop table 44. The transmission is limited in duration to the availability of incoming data (or the data payload size for that frame) and following the transmission, the radio switches to a receive mode and processes any incoming data. Once reception is complete, the transmit interval/receive interval cycle is restarted on a new frequency selected from the hop frequency set. Transmit receive cycling continues until all 75 unique frequencies in the set have been used, whereupon the frequency selection process reenters the top of the hop table and begins reusing the same 75 frequencies.

Transmitted data is directly modulated using modular 46 onto a synthesized carrier by use of minimum shift keying (MSK) modulation. The receiver is a dual conversion super heterodyne, down converting the received signal first to a 315 MHZ intermediate frequency (IF) signal and then down converting a second time to a 10.7 MHZ IF signal. Demodulation is accomplished using a limiter/discriminator circuit and the demodulated data is recovered from the demodulator output by processing through a comparator. First and second local oscillators (LOs) 50,52 are controlled in frequency by frequency control circuit 38 which performs a single loop indirect frequency synthesis. Samples of both first and second voltage controlled local oscillators (VCOs) 50,52 are divided down using phase-locked loop integrated circuit elements, where each sample is compared to an onboard 8 MHZ crystal reference oscillator. During the transmit interval, a single transmitter VCO is controlled by the same device and in the same manner.

To minimize total power consumption within the transceiver, portions of circuitry not in use during either the transmit or receive intervals are disabled under control of the system controller 16.

Frequency management is accomplished by a method incorporated in the transceiver control software. The transceiver initially powers up in an "idle slave" mode and operates in receive mode only, stepping through all 75 hop frequencies while "listening" for an incoming header packet matching the idle slave's local address.

When data is presented to a transceiver via its local communications port (e.g., RS-232), the transceiver immediately shifts from idle slave mode to a "master search" mode wherein the master transmits and then listens for (receives) an acknowledgment signal from a targeted remote slave device (i.e., a transceiver in idle slave mode). The transmit and receive periods each represent one-half of a complete hop interval. The master continues to search for the slave device until a valid acknowledgment is received or until a predetermined time-out period expires. The initiation of master search mode starts at whichever hop frequency the transceiver was previously using while in idle slave mode and continues to step through the hop table selecting frequencies in turn. Since the incoming data is a synchronous in nature, the master transceiver essentially begins this process at a random point within the hop table.

An idle slave device, after receiving a valid header data packet, transmits an acknowledgment packet during the master's listening phase of the hop interval, thereby creating a synchronized and linked session for data transfer. Once linked, the master and slave transceivers increment through all 75 entries in the hop table for as long as incoming data is present for either unit, after a programmable time-out period. The master transmits during the first half of each hop interval and the slave transmits during the second half of the interval with the slave device adjusting its response time in accordance with the received data packet, thereby maintaining synchronization between both master and slave devices. When neither master nor slave has any additional data to transmit, both units return to the idle slave mode after a preprogrammed time-out period.

The receiver portion of the transceiver is implemented very economically: the recovered analog serial data stream is digitized by thresholding the signal using a comparator and a threshold generated from a peak follower. The peak follower follows both the positive and negative peaks of the analog serial data stream and then generates a threshold signal that is half way between the two peaks. The output of the comparator is the digital received signal directed to digital board 12. A universal asynchronous receiver-transmitter (UART) is incorporated in each transceiver to process both transmit and received data.

Transceivers communicate using an On-Air Protocol that is stored in firmware and includes specific characteristics for the two types of on-air "frames", i.e., the linking frame and the data frame. The linking frame is transmitted when transceivers are not currently communicating to synchronize them to the same frequency. Once the transceivers are synchronized, data frames are transmitted until the (then) current session ends, even if there is no data to be sent. "Synchronization", as used here, does not mean that precisely synchronized clocks (i.e., between transceivers) are required, however.

Turning now to a more detailed description of transceiver RF components, RF Board 13 consists of a transmitter, receiver, frequency synthesizer and a transmit/receive (T/R) Switch 56. Each of these sections is controlled by microprocessor 16 to either transmit serial data or receive serial data.

The basic transmitted signal is generated by a voltage-controlled-oscillator (VCO) that operates in the 2.4 to 2.4835 GHz frequency band. The signal is then amplified by three stages of amplification. All three amplification stages and the VCO are switched ON for transmit and switched OFF for receive.

The first stage of amplification is provided by a bipolar transistor capable of generating at least 10 dBm output power to boost the signal generated by the VCO and drive the exciter stage and to provide some isolation between the power stages and the VCO. The base bias on both the VCO and bipolar amplifier is controlled to provide the transmit ON/OFF function.

The exciter stage boosts the power to at least 22 dBm to drive the power amplifier stage. The is accomplished using a GaAs RF Power FET. A power control circuit is used to generate the gate bias voltage. The circuit is a closed loop control circuit that controls the level of drain current. Different drain current settings are used to control the output power of the amplifier. This includes the OFF state for receive as well as three other power levels. The power level settings are programmed via two control lines accessible at the RF Board connector. The circuit also controls the turn-on and turn-off times so that spectral splatter can be reduced.

The power amplifier stage provides 26 dBm of output power to drive the antenna. This stage also uses a GaAs RF Power FET and a similar power control circuit. The same two control lines that control the exciter power level also control the power amplifier power level. The transmitted signal passes through T/R switch 56 and a 2.44 GHz 4-pole bandpass filter to the antenna. Both T/R switch 56 and the bandpass filter are implemented using strip line on a separate daughter board.

As noted above, the receiver uses dual conversion with a first IF of 315 MHZ and a second IF of 10.7 MHZ. The received signal from the antenna passes through the same 2.44 GHz filter the transmitted signal passed through and then passes through the T/R switch 56 to a low noise amplifier (LNA). The filter acts as a preselector to prevent strong out-of-band signals from desensitizing the receiver. The LNA provides approximately 15 dB gain with 2 dB noise figure. An image rejection filter centered on 2.44 GHz follows the LNA, and is implemented as a strip-line 2-pole bandpass interdigital filter on a separate daughter board.

The first heterodyne mixer is after the image filter. The local oscillator (LO) for the first mixer is a 2.085 to 2.1685 GHz VCO which is part of the synthesizer. At each hop frequency, the first LO is tuned to a frequency 315 MHZ below the receive frequency. The LO signal passes through the LO filter to the first mixer. This filter is also implemented on the daughter board using strip line and is a 2-pole bandpass interdigital filter centered at 2.125 GHz. The output of the mixer consists of a number of signals, one of which corresponds to the first IF of 315 MHZ. A 315 MHZ surface acoustic wave (SAW) filter follows the mixer to select the first IF from amongst the products of the mixer. Following the SAW filter is a stage of 315 MHZ amplification. The signal then passes to the second heterodyne mixer. The second mixer uses a high side LO frequency of 325.7 MHZ so that mixing products are not generated on other channels in the 2.4 to 2.4835 GHz frequency band. The desired result of this mixer is a 10.7 MHZ signal which then passes through a 10.7 MHZ ceramic 150 KHz bandpass filter to an IF amplifier. The signal passes through another 10.7 MHZ ceramic 150 KHz bandpass filter after the IF amplifier and then to the limiter amplifier. Both of these amplifiers and the active part of the discriminator are a part of an IF processing chip. A third 10.7 MHZ ceramic 400 KHz bandpass filter is used as the delay element in the discriminator. The discriminator produces an analog version of the serial data stream.

The analog serial data stream is digitized by thresholding the signal using a comparator and a threshold generated from a peak follower. The peak follower follows both the positive and negative peaks of the analog serial data stream and then generates a threshold signal that is half way between the two peaks. The output of the comparator is the digital received signal output to the digital board.

The frequency synthesizer generates the modulated transmit signal, the receiver first LO, and the receiver $2^{nd}$ LO, each phase locked to the on-board 8 MHZ reference.

The 8 MHZ reference is a crystal oscillator that is controlled by the off-board microprocessor 16. To enable a cost effective solution for the reference an inexpensive crystal is utilized. Because a frequency tolerance of 3 parts per million (ppm) must be maintained for the transceiver to communicate, a frequency compensation routine is programmed for execution with microprocessor 16. The compensation deals with both the initial crystal manufacturing tolerance and maintaining tolerance over the specified −20 to 70 degrees Celsius temperature range.

The transmitted signal is generated by a VCO, switched on during transmit, operating over a 350 MHZ tuning range roughly centered on 2.44 GHz. During operation the VCO only tunes in the 2.4 to 2.4835 GHz band. Having a larger tuning range allows for manufacturing tolerances without the need to tune the oscillators for each manufactured board. During operation, the synthesizer chip is programmed to the required hop frequencies. The chip has a fast and a slow loop mode. When a frequency is first programmed the chip is placed in the fast mode. After a selected interval of approximately 3 ms the chip is switched to slow mode. This allows the tuning loop time to settle on the correct frequency and then slows the loop so that frequency modulation of the transmitted signal by the data can be accomplished by impressing very small changes on the tuning voltage. If the tuning loop were not slowed then it would be able to partially correct the small tuning voltage impressions and cause pulse droop on the subsequently received signal.

The first LO signal is generated by second LO VCO 52, switched on during receive in the place of the transmit VCO 50. This receive VCO 52 shares the same connections to the synthesizer chip that the transmit VCO 52 does. As with the transmit VCO it has a tuning range of 350 MHZ to allow for manufacturing tolerances. Its tuning range is roughly centered on 2.125 GHz which is 315 MHZ below the transmit frequencies. During operation it hops to frequencies in the 2.085 to 2.1685 GHz band. Unlike the transmit VCO, the synthesizer chip is tuned to a frequency in fast mode and never switched to slow mode. This allows the synthesizer combination to have a much better close-in phase noise.

The second LO signal is generated by a VCO that has approximately a 35 MHZ tuning range centered on 325.7 MHZ. This VCO is connected to the low frequency section of the dual frequency synthesizer chip. This VCO and this section of the synthesizer chip are energized only while receiving. It is always programmed to 325.7 MHZ.

The RF Board I/O Interface consists of two mechanical connections. Most of the connections are made via a 20 pin dual in-line header. The antenna connection is a microstrip pad and ground to which the coaxial antenna cable is soldered. TTL-compatible input signals on an Rx/Tx-pin are used to control the Rx/Tx switch 56. A logic high on this pin puts the Rx/Tx switch 56 in the receive position and a logic low puts it in the transmit position. Before the radio switches from Rx mode to Tx Mode the Rx/Tx switch 56 should be put in the Tx position. When switching from Tx mode to Rx mode the switch 56 should remain in the Tx position until after the radio is switched from Tx to Rx.

Figure 5:
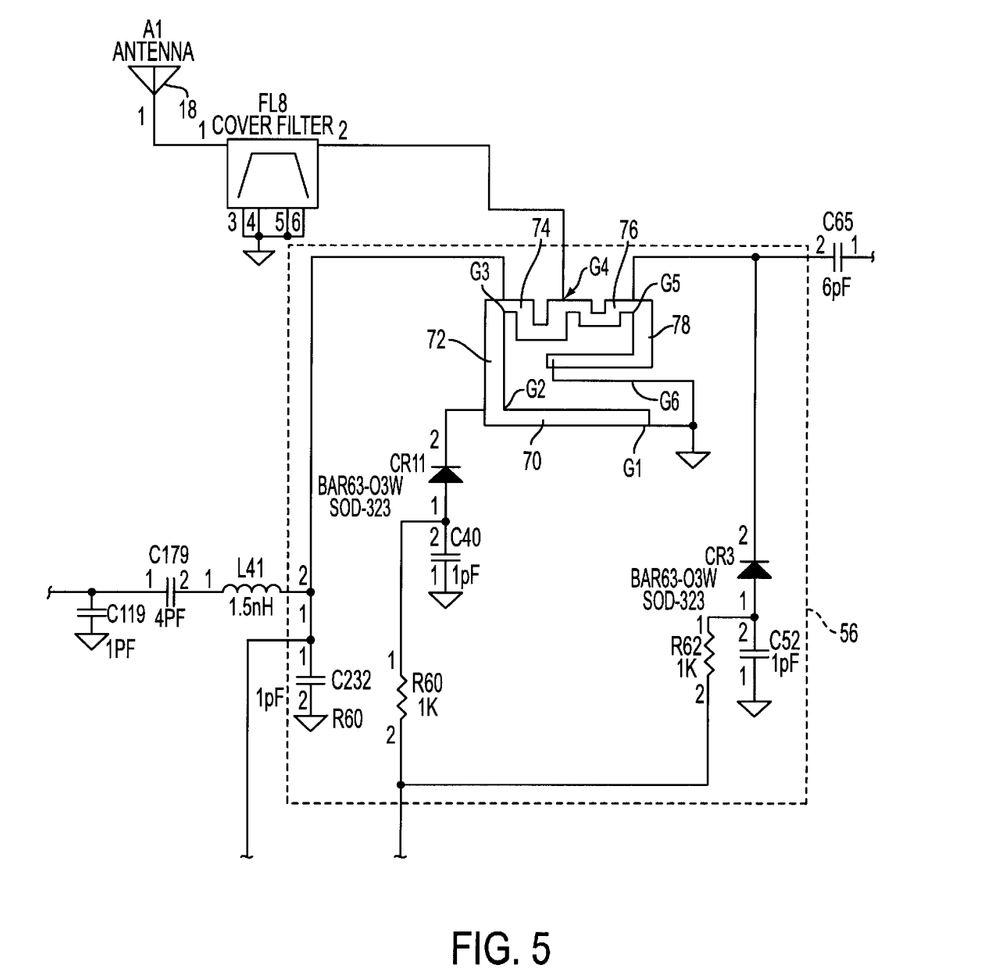
FIG. 5 is an annotated schematic diagram illustrating the transmit/receive (TX/RX) switch, in accordance with the present invention.
Figure 6:
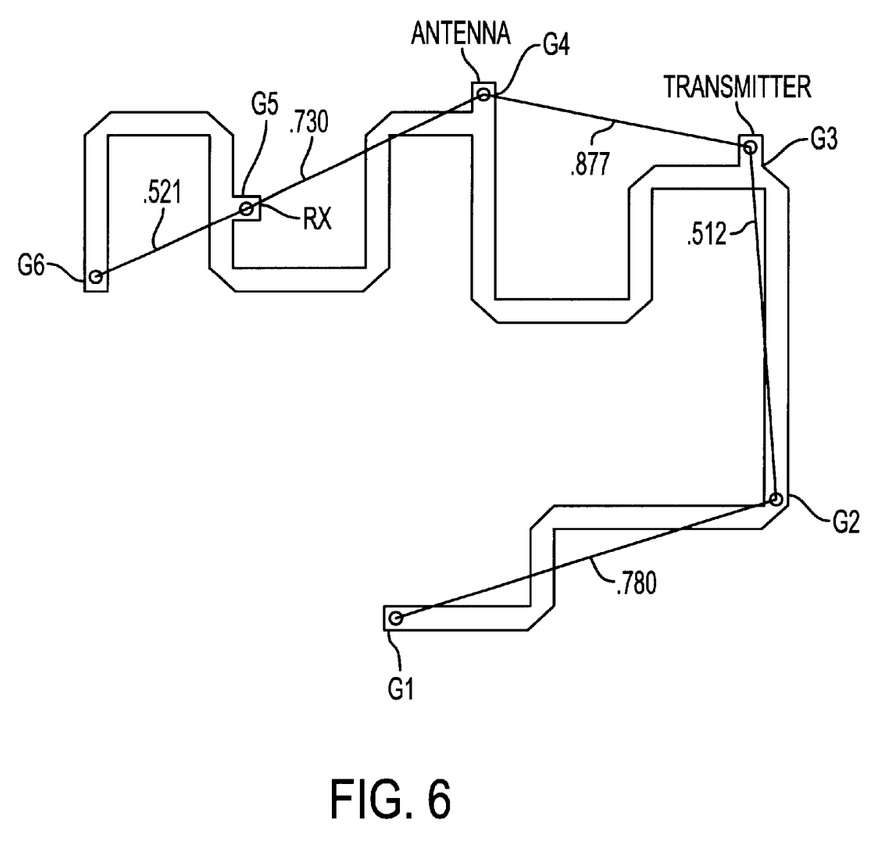
FIG. 6 is an annotated plan view of the microstrip embodiment of the transmit/receive (TX/RX) switch, in accordance with the present invention.
Figure 7:
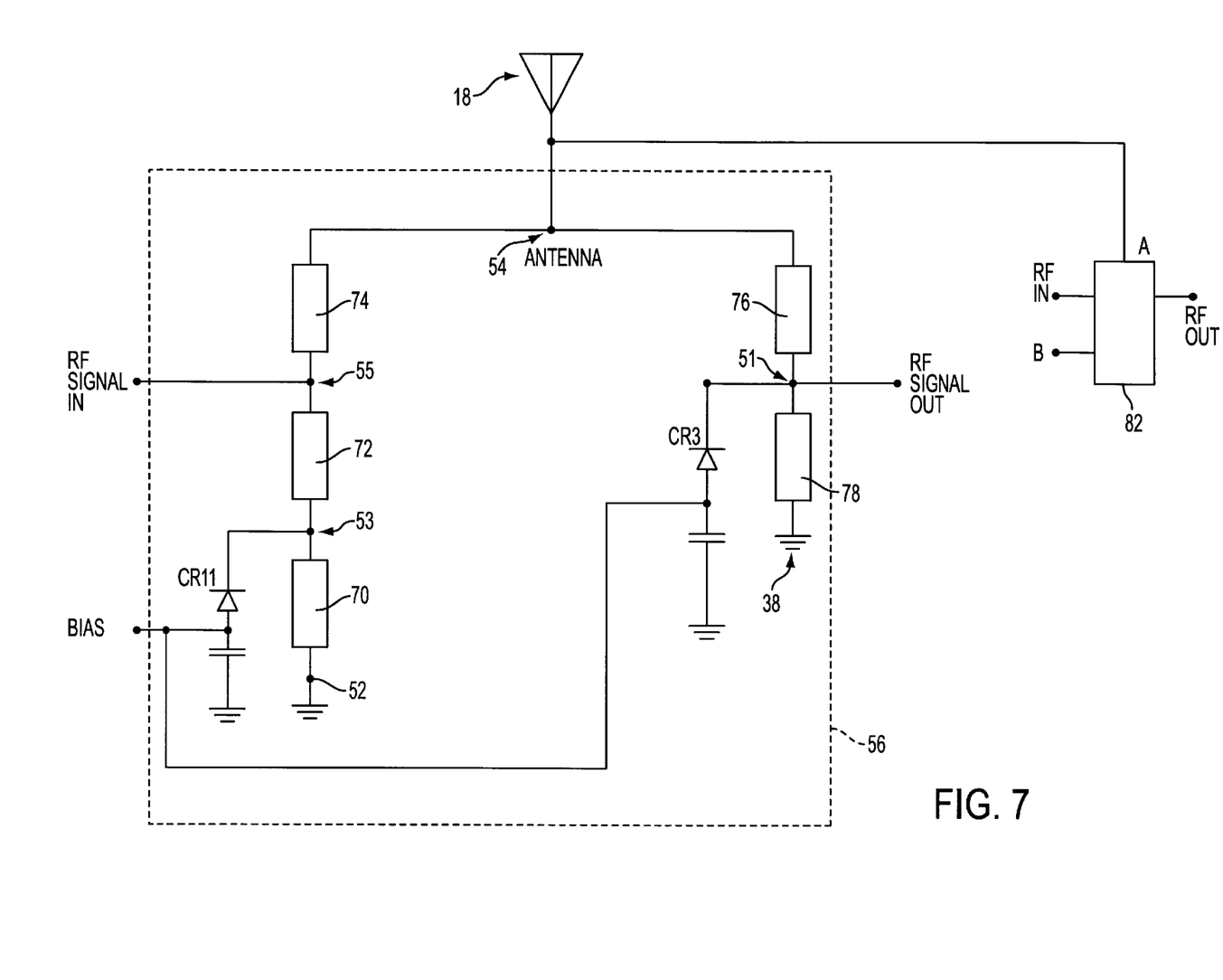
FIG. 7 is a diagram illustrating a two port embodiment of the transmit/receive (TX/RX) switch, in accordance with the present invention.

Turning now to the T/R switch 56 illustrated in the schematic of FIGS. 5, 6 & 7 only two p/intrinsic/n (PIN) diodes, CR 11, CR 3 are used to implement the switching functions; many more are commonly used in transceiver T/R switch circuits. Neither one of the PIN diodes is in the transmit power path so the raw transmitter power doesn't actually flow through either PIN diode, and when energy is applied to neither diode, the switch is set to one of two positions, and so, in effect, the switch is a single pull, double throw transmit/receive switch using five electrically controlled transmission line lengths.

More particularly, in neither transmit or receive modes does the transmit power flow through either diode CR11, CR3. In many prior art PIN diode switches—the amount of power that can be passed through the T/R switch is limited by the performance of the PIN diode as a series element through which the transmit power passes. In the T/R switch of the present invention, both PIN diodes are configured to not be in the series path of the transmit power. The switch configuration is such that in the transmit path case, both PIN diodes are energized, meaning current is flowing through them. In the receive case, neither PIN diode requires current, thereby providing the minimal insertion loss in the receive path. When in the receive mode, both PIN diodes are turned off; the receiver uses much less power than the transmitter. When transceiver 10 is in a low power mode, and only receiving, there is no need to have current flowing through T/R switch 56 to achieve the fully "on" receive state.

R/T switch 56 works by using five transmission line segments 70, 72, 74, 76 and 78, each approximately one quarter wavelength in length, to translate the impedance changing characteristics of the PIN diodes to the three RF ports, i.e. the transmitter port 55, the antenna port 54 and the receive port 51. The antenna is switched either to the transmitter (for purposes of passing power to the antenna) or to the receiver (for purposes of the receiver getting receive signals from the antenna). Now, referring to the drawing (FIG. 5) and the numbers on the switch body as shown in the schematic, when the switch is in the transmit configuration—both PIN diodes (CR3 and CR11) are energized, meaning both PIN diodes provide a relatively low impedance. Starting from the transmit side of the switch, diode CR 11 is energized, current flowing, with a fairly low impedance. C 49 is a one picofarad (pf) capacitor (as shown in the drawing) in series with the signal path of the pin diode CR 11. The one pf capacitor C49 resonates the inductive parasitics out of the package of CR 11, to provide an even lower impedance at Diode connection Point 53, a terminal point on the microstrip artwork outline. The copper micro strip serpentine line is the physical realization of the T/R switch outside of the separate components. Point 53 experiences a very low impedance delivered by the "on" state of CR 11 in conjunction with C 49 and there is, between Point 53 and Point 55, microstrip line segment 72 having a length of about one quarter wavelength. Microstrip line segment 72 is also known in the art as a quarter wave resonator. Quarter wave resonators function such that if one applies a short circuit to one end, the reflection of that short circuit at the other end, a quarter wave distant, is an open circuit. Thus, the result of Point 53 being effectively signal grounded by CR 11 is that, a quarter wave distant at Point 55, there is virtually no loading placed on transmitter port 55, due to the novel switch architecture. The quarter wave microstrip line segment 72 between point 53 and port 55 electrically makes it more or less disappear, so that the transmitter output injected at port 55 sees no loading due to the switched microstrip line segment 72 between point 53 and port 55. Power entering transmitter port 55 is free to travel in the only direction where it sees a load, through microstrip line segment 74 toward port 54, the common antenna feed point. This energy tries to go not only out port 54 to the antenna, but also through microstrip line segment 76 toward port 51, the receiver input port.

The other PIN diode CR3 works in a way to prevent power from flowing into the receiver, thus avoiding both damage the receiver and power losses to the transmit path. CR 3, the PIN diode on the receive side, works in conjunction with capacitor C 52 to provide a very low impedance during the transmit phase at port 51. Port 51 is separated from port 54, the antenna port, by quarter wave microstrip line segment 76 and this again allows the short placed on port 51, by CR 3 and C 52, to reflect an open circuit from this port to port 54, the antenna common port, thereby preventing energy from flowing into the receiver, potentially damaging the receiver and also preventing transmitter energy from being wasted by reflecting an open circuit from the receive port 51 to the antenna port 54.

Similarly, when in the receive mode, both PIN diodes are turned off. The impedance of both PIN diodes when no current flows is a small capacitive reactance. With both diodes off, the T/R switch is in the receive mode and the objective is to transfer energy efficiently from the antenna port, 54, to the receive port, 51, and avoid any interference in this case or energy loss anywhere else, i.e., the transmit port. Turning now to the isolated or deselected port 55 as regards the receive position switch, the way the architecture works in receive mode is that, starting from CR 11's port 53, where CR 11 enters the microstrip matrix, the "off" pin diode represents a small capacitive load to Port 53 while port 52 is a grounded end of another, near quarter wave, microstrip segment 70. Microstrip segment 70 between ports 52 and 53 is slightly shorter than a quarter wavelength, because the purpose of this piece of microstrip is to act as an inductive reactance that effectively resonates out the capacity loading of CR 11 as seen on Port 53 when in the "off" mode. The net effect of microstrip segment 70 between ports 52 and 53, when resonating out this capacity loading, is to produce an open circuit at port 53. Accordingly, in the receive mode, quarter wave segment 70 between port 53 and the transmit port 55, the open circuit now at 53 is reflected by the quarter wave segment 72 between ports 53 and 55 to be a short circuit at port 55. The unused transmitter output port thus becomes a short circuit and prevents any power from flowing backwards into the (turned off) transmitter, working in concert with the quarter wave strip 74 between port 55 and port 54, the antenna port, to reflect an open from the transmitter port on to the antenna port at 54. This prevents the receive signal power coming into the antenna and intended for the receiver from inadvertently being absorbed or partially absorbed via the unused transmitter output. Moving on from 54, energy from the antenna enters port 54, flows via microstrip line segment 76 over to port 51, where the energy is propagated into the receiver preamp. In this state, port 51 is loaded by the "off" capacity of CR 3, the other PIN diode, and that capacity is resonated away from being a problem by a second, shorter than quarter wavelength stub microstrip line segment 78, the stub segment that connects port 51 of the switch microstrip to grounded port 38 as shown in FIG. 5. The slightly shorter than quarter wave stub 78 is grounded at port 38 and reflects an inductive reactance to port 51; that reactance is calculated to resonate with the "off" capacity of CR 3, the receive side PIN diode, which effectively cancels the capacitive reactance, allowing the energy to flow out of port 51, not toward the PIN diodes, not toward the shorted microstrip at port 38, but only into the receiver preamp. The two shorted stubs 70, 78 can be ignored when in the transmit mode, because the very finite and normal inductive reaction they reflect into ports 53 and 51 when in the transmit mode is rendered irrelevant by the fact that, in transmit mode, the combination of PIN diodes CR 11 and CR 3 put a short circuit onto port 53 and 51, respectively. The fact that this short is additionally parallel loaded with the inductive reactance of the stub lines grounded at ports 52 and 38 is of no consequence since, that very finite inductive reactance is shorted out effectively by the PIN diode which, in the transmit mode, is producing a short circuit by design at port 53 and port 51. So the two shorted stub lines 70, 78 are of no interest in the transmit position, but are very much of interest when in the receive position.

The realization of the T/R switch 56 is a combination of the two dimensional artwork as best seen in FIG. 6 and the circuitry arrangement; that is, the arrangement of the PIN diodes, and the capacitors that resonate out the PIN diode parasitics. In the general case, T/R switch 50 will work at other frequencies, where the package parasitics aren't important, without capacitors C49 and C52.

T/R switch 56 is useful in applications for transceivers where the transmitter power is quite high, (i.e, also particularly in the kilowatt range and above) because there are difficult problems when high powered switch transmitters are configured so that power flows through the PIN diodes, the PIN diodes actually become "drained". For example, passing a one milliamp (mA) bias current through a PIN diode allows it to pass a peak current of hundreds of milli-Amps of RF power, because the PIN diode is effectively a capacitor, but with finite capacity. There is a limiting function. When a PIN diode is biased 'on' and an RF signal is passed through, the PIN diode integrates control current over time and stores, within itself, a bulk of charge, due to bias current. As RF power flows through the PIN diode, it draws against that bulk of charge; when the rf peak power is tending to reserve bias the PIN diode, it draws against that charge as it passes power through the PIN diode. If enough is drawn, it can actually draw the PIN diode's bulk of charge is depleted and the diode will instantaneously turn off. A figure of merit for PIN diodes used in high powered transmitter is how much RF current will be supported without depletion. The ratio of bias current to peak RF current flow is another figure of merit for PIN diodes in transfer applications. With R/T switch 56, the emphasis of the PIN diode figure of merit parameters is safely ignored and less expensive PIN diodes can be used in high RF power applications.

As for the PIN diode bias, the receive side PIN diode, CR 3, is biased through R 62, a 1 Kohm resistor, and R 60, the 1 Kohm resister biases CR 11 on the transmit side. The current return path to the diodes is through the microstrip switch architecture to ground, in both cases. Another advantage of the switch 56 is that the entire RF path is grounded; there is no need to put PC blocking capacitors in the RF path. The exemplary embodiment of R/T Switch 56 is implemented as microstrip but could be done with strip line segments as well.

The conductor on the other side of the board is a ground return. R/T Switch 56 can be implemented with coax transmission line segments even at even lower frequencies.

R/T Switch 56 is incorporated, preferably, as part of RF Board 13, within transceiver 10. Preferably, the RF Board 13 is a printed circuit board fabricated from Arlon® material designated as "25N," a ceramic epoxy composite material. Preferably the RF Board is 25 mills thick and, as noted above, R/T Switch 56 is implemented as a micro strip structure, as shown in FIG. 6, having conductive lines over a solid ground plane on the opposite side of the board. FIG. 6 illustrates the artwork for R/T Switch 56. Each of the transmission lines is of 50 ohm characteristic impedance and all line widths are 50 mils. It should be noted that, at Band Center, a quarter wave length equals 0.775 inches. Each of the segment lengths, in inches, is indicated in FIG. 6.

Referring to FIGS. 5, 6 & 7, the RF or microwave transmission line structure of the preferred embodiment is configured as five transmission line segments 70., 72, 74, 76 and 78, with electrical connection points or ports defining the segment ends. First transmission line segment or stub 70 from G1 to G2 is, as shown in FIG. 6., 0.78 inches long and has, at one end, a ground connection 52, and at the opposite end, a connection to the first PIN diode CR11. Second transmission line segment 72 extends from point G2 to point G3, corresponding to transmitter or "RF in" port 55, and has a length of 0.512 inches. Third transmission line segment 74 extends from point G3 to point G4, corresponding to antenna port 54, and has a length of 0.877 inches. Fourth transmission line segment 76 extends from point G4 to point G5, and has a length of 0.73 inches. Point G5 corresponds to receiver preamp or "RF out" port 51. Fifth transmission line segment or stub 78 extends from point G5 to point G6 and has a length of 0.521 inches.

Figure 8:
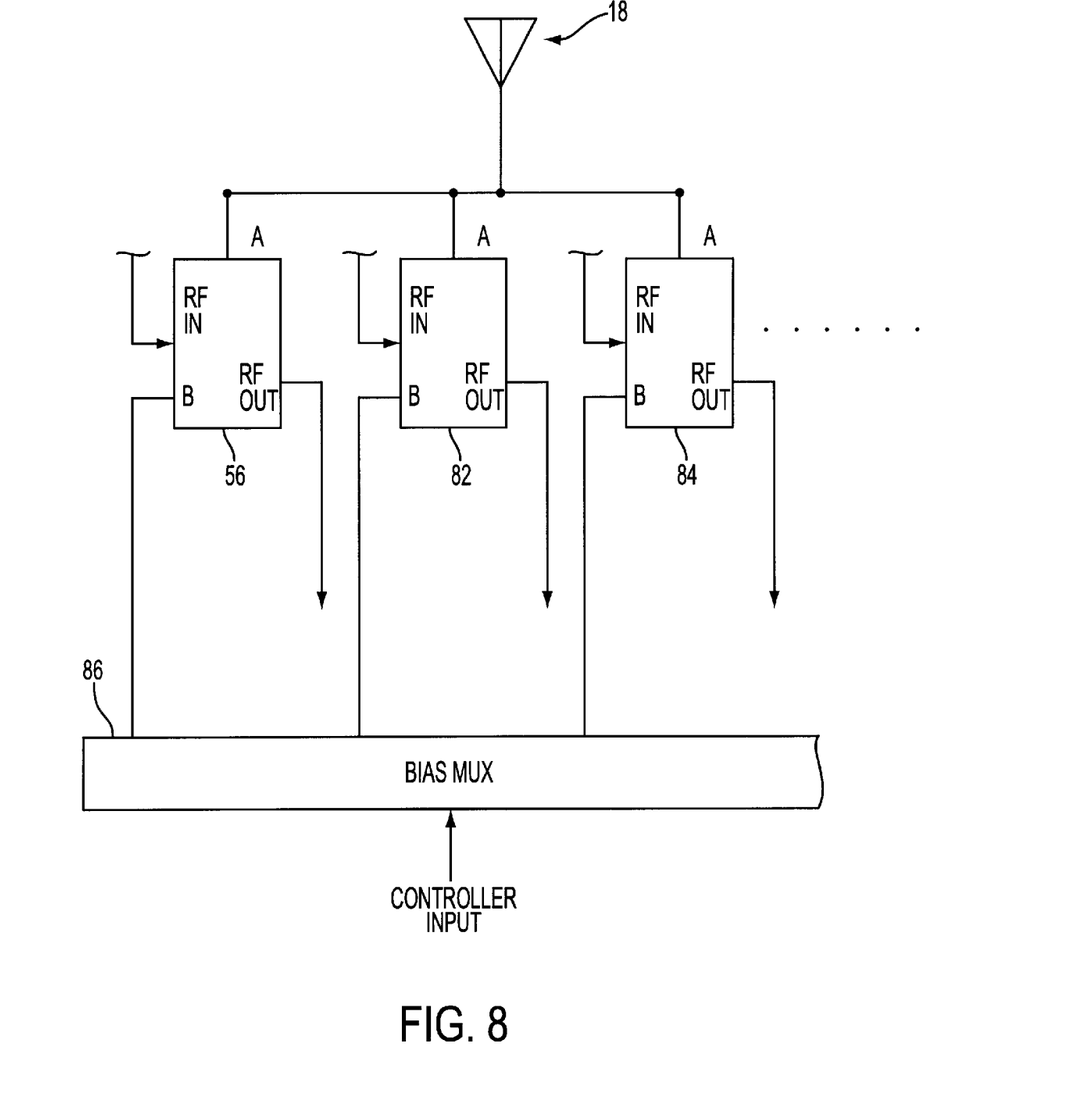
FIG. 8 is a diagram illustrating a multiport embodiment of the transmit/receive (TX/RX) switch of FIGS. 5, 6 and 7 with multiplexed bias signal line control, in accordance with the present invention.

The R/T switch structure of the present invention can be employed in other configurations, as well. For example, FIG. 7 is a diagram illustrating a two port embodiment of the transmit/receive (TX/RX) switch, which could be used to connect separate transceivers to a single antenna (e.g., 18 or any of the auxiliary antennae of FIGS. 4a–4d). T/R switch 56 is illustrated in diagrammatic form, illustrating that there are three signal and control connections per T/R switch. The signal connections are "RF in" and "RF out", and the PIN diode bias control signal connection is labeled "Bias". A second T/R switch 82 is illustrated and has the same three signal and control connections, "RF in", "RF out", and "Bias". Since both T/R switch 56 and second T/R switch 82 are connected to an antenna, it may be useful to control when each is switched to the transmit state, and so the Bias control lines can be multiplexed. Any number of T/R switches may ganged in this way. For example, FIG. 8 is a diagram illustrating a multiport embodiment using a plurality of the transmit/receive (TX/RX) switch of FIGS. 5, 6 and 7 with multiplexed bias signal line control. First, second and third R/T switches 56, 82, and 84, respectively, are ganged together and the bias lines are multiplexed through a bias signal multiplexor 86.

Figure 9A:
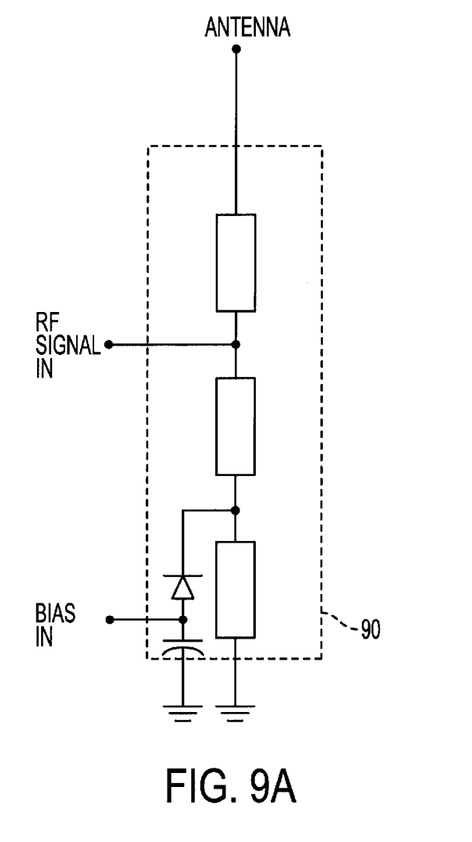
FIG. 9a is a diagram illustrating an embodiment of the transmit/receive (TX/RX) switch separable transmit or "RF in" component, in accordance with the present invention.
Figure 9B:
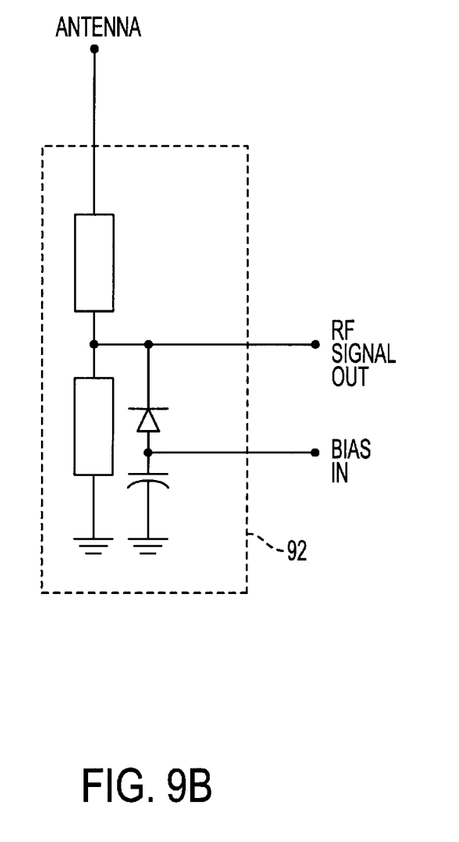
FIG. 9b is a diagram illustrating an embodiment of the transmit/receive (TX/RX) switch separable receive or "RF out" component, in accordance with the present invention.

As shown in FIGS. 9a and 9b, the T/R switch of the present invention is also configurable as separable "RF out" and "RF in" components 90, 92 which can be individually actuated via a selectively controllable bias line. FIG. 9a is a diagram illustrating an embodiment of the transmit/receive (TX/RX) switch separable transmit or "RF in" component 90, and FIG. 9b is a diagram illustrating an embodiment of the transmit/receive (TX/RX) switch separable receive or "RF out" component 92.

Figure 10:
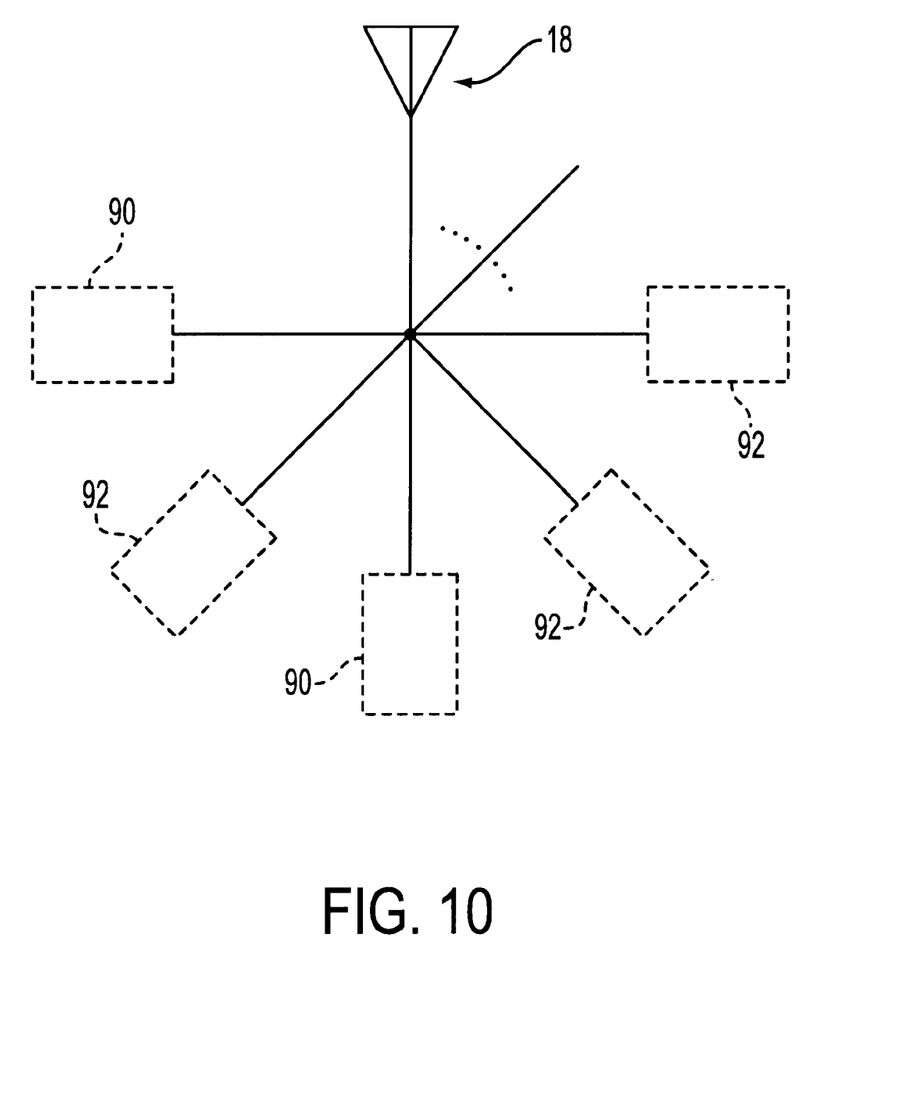
FIG. 10 is a diagram illustrating a multiport embodiment of the transmit/receive (TX/RX) switch with the separable "RF in" and "RF out" components of FIGS. 9a and 9b, in accordance with the present invention.

FIG. 10 is a diagram illustrating a multiport embodiment of the transmit/receive (TX/RX) switch with the separable "RF in" and "RF out" components of FIGS. 9a and 9b. Multiple "RF out" and "RF in" components can be configured into a Multiport RF hub connectable to an antenna (e.g., 18 or any of the auxiliary antennae of FIGS. 4a–4d) or another common port, to permit selection of energy flow direction out of or into selected "RF out" or "RF in" ports.

It will be appreciated by persons of ordinary skill in the art that the present invention makes available an economical, compact frequency hopping spread spectrum wireless data telemetry transceiver which includes an antenna selectively, electrically connectable to either a transmitter output port or a receive input port through a novel transmit/receive switch. The transmit/receive switch is connected to the transmitter output port at a transmitter connection node and also connected to the receive input port at a receive connection node, and further includes an antenna connection at an antenna connection node. The transmit/receive switch comprises a first transmission line segment connected between the transmitter connection node and the antenna connection node having a first selected electrical length and further includes a second transmission line segment connected between the receive connection node and the antenna connection node having a second selected electrical length. It is understood that electrical lengths, in this sense, means a selected length in wave lengths at the transmit or receive frequencies. The transmit/receive switch further comprises a first semiconductor circuit element, in the preferred embodiment a PIN diode, having a conducting state in a substantially non-conducting state. The transmit/receive switch further comprises and third transmission line segment connected between the transmitter connection node and the first semiconductor circuit element connection node (e.g. PIN diode). It is selectively operable to effectively ground the third transmission line segment at the first semi-conduct or circuit element connection node when in the conducting state. This grounded condition is reflected through the selective electrical length of the third transmission line segment to appear as an open circuit at the selected electrical length, approximately a quarter wave length away. The transmit/receive switch further comprises a second semiconductor circuit element (e.g. a PIN diode as illustrated above, in the preferred embodiment) having a conducting state and a substantially nonconducting state and being connected between the receiver connection node and a grounded node. The transmit/receive switch further comprises a fourth transmission line segment connected between the receiver connection node and a grounded terminal node, and the second semiconductor circuit element is selectively operative to effectively ground the receiver connection node. The second transmission line segment has a second selected length which is sized to translate the selectively grounded receiver connected node to an open circuit at the antenna connection node. thereby forcing substantially all the transmitter energy input to the transmitter connection node to pass to the antenna connection node and outwardly through the antenna, thereby directing substantially all transmitter energy away from the receiver preamp circuitry. As noted above, in the preferred embodiment, the transmit/receive switch includes a fifth transmission line segment connected between the first semiconductor circuit element connection node and a second grounded terminal node, and is dimensioned to have an electrical length which presents an open circuit at the receiver connection node when the second semiconductor circuit element is in the substantially non-conducting state.

It should be pointed out that, in terms of electrical length, transmission line theory indicates that any odd number of quarter wave length segments will achieve a similar effect as provided by the selected electrical lengths disclosed in the preferred embodiment. Accordingly, a one quarter wave length transmission line segment is, in a sense, electrically equivalent to a three quarter wave length or five quarter wave length transmission line segment.

It will also be appreciated that, when evaluating transmission lines on a Smith chart, an electrical length approximately equal to a quarter wave length provides an electrical response close to that for an electrical length of exactly one quarter wave length. By evaluating the change in impedance, as a function of wave length, one can appreciate the elegant simplicity of the instant design.

It will also be appreciated that, by selecting a transmission line lengths slightly greater or slightly less than one quarter wave length, either capacitive or inductive effects can be achieved which will provide corresponding effects in resonating out the inherent capacitance in a PIN diode. In the circuit of the preferred embodiment, as described above, lump circuit elements such as capacitors are used in this way, these capacitors could be replaced, in effect, by selected configurations of microstrip or stip line circuit elements with similar capacitive properties at the frequency of interest.

Having described preferred embodiments of a new and improved circuit and method, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. An economical, compact, wireless data telemetry transceiver, comprising:

a transmitter having an output port;

a receiver having an input port;

an antenna selectively electrically connectable to one of said transmitter output port and said receiver input port through a transmit/receive switch;

said transmit/receive switch being connected to said transmitter output port at a transmitter connection node, being connected to said receiver input port at a receiver connection node and being connected to said antenna at an antenna connection node;

said transmit/receive switch comprising a first transmission line segment connected between said transmitter connection node and said antenna connection node and having a first selected electrical length;

said transmit/receive switch further comprising a second transmission line segment connected between said receiver connection node and said antenna connection node and having a second selected length;

said transmit/receive switch further comprising a first semiconductor circuit element having a conducting state and a substantially non-conducting state;

said transmit/receive switch further comprising a third transmission line segment connected between said transmitter connection node and a first semiconductor circuit element connection node;

said first semiconductor circuit element being selectively operable to effectively ground said third transmission line segment at said first semiconductor circuit element connection node when in said conducting state.

2. The wireless data telemetry transceiver of claim 1, wherein said first semiconductor circuit element comprises a PIN diode.

3. The wireless data telemetry transceiver of claim 1:

said transmit/receive switch further comprising a second semiconductor circuit element having a conducting state and a substantially non-conducting state and being connected between said receiver connection node and a grounded node;

said transmit/receive switch further comprising a fourth transmission line segment connected between said receiver connection node and a grounded terminal node;

said second semiconductor circuit element being selectively operable to effectively ground said receiver connection node;

said second transmission line segment second selected length being sized to translate the selectively grounded receiver connection node to an open circuit at said antenna connection node, thereby forcing substantially all transmitter energy input to the transmitter connection node to pass to said antenna connection node.

4. The wireless data telemetry transceiver of claim 3, wherein said second semiconductor circuit element comprises a PIN diode.

5. The wireless data telemetry transceiver of claim 3, further comprising:

a fifth transmission line segment connected between said first semiconductor circuit element connection node and a second grounded terminal node.

6. The wireless data telemetry transceiver of claim 5, said fifth transmission line segment connected between said first semiconductor circuit element connection node and said second grounded terminal node having an electrical length sized to present an open circuit at said receiver connection node when said second semiconductor circuit element is in said substantially non-conducting state.

7. The wireless data telemetry transceiver of claim 5, said first transmission line segment connected between said transmitter connection node and said antenna connection node having an electrical length of approximately one quarter wavelength.

8. The wireless data telemetry transceiver of claim 5, said third transmission line segment connected between said first semiconductor circuit element connection node and said transmitter connection node having an electrical length of approximately one quarter wavelength.

9. The wireless data telemetry transceiver of claim 5, said second transmission line segment connected between said receiver connection node and said antenna connection node having an electrical length of approximately one quarter wavelength.

10. The wireless data telemetry transceiver of claim 5, said fourth transmission line segment connected between said receiver connection node and said second grounded terminal node having an electrical length sized to present an open circuit at said first semiconductor circuit element connection node when said first semiconductor circuit element is in said substantially non-conducting state.

11. A transmit/receive switch adapted to selectively switch an antenna connection at an antenna port to either a transmitter port or a receiver port, comprising:

a first RF switch; said first RF switch having a conducting state and a non-conducting state;

a first conductive RF switch connection node connected to said first RF switch;

a conductive transmitter connection node connected to the transmitter port;

a conductive receiver connection node connected to the receiver port;

a conductive antenna connection node connected to the antenna port;

a first transmission line segment connected between said transmitter connection node and said antenna connection node and having a first selected length approximately equal to an odd number of quarter wavelengths, a second transmission line segment connected between said receiver connection node and said antenna connection node and having a second selected length approximately equal to an odd number of quarter wavelengths, a third transmission line segment connected between said transmitter connection node and said first RF switch connection node and having a third selected length approximately equal to an odd number of quarter wavelengths;

said first RF switch, when in said conducting state, effectively grounding said first RF switch connection node, thereby providing an open circuit impedance at said transmitter connection node through said third transmission line segment.

12. The transmit/receive switch of claim 11, said first RF switch comprising a PIN diode.

13. The transmit/receive switch of claim 11, said third transmission line segment third selected length being substantially equal to one quarter wavelength.

14. The transmit/receive switch of claim 11, further comprising a second RF switch; said second RF switch having a conducting state and a non-conducting state;
a second conductive RF switch connection node connected to said second RF switch; said second conductive RF switch connection node being connected to said antenna connection node;
a first conductive earth connection node connected to ground;
a fourth transmission line segment connected between said receiver connection node and said first conductive earth connection node and having a selected length approximately equal to an odd number of quarter wavelengths; and
said second RF switch, when in said conducting state, effectively grounding said second RF switch connection node, thereby providing an open circuit impedance at said antenna connection node through said second transmission line segment.

15. The transmit/receive switch of claim 14, said first RF switch and said second RF switch being simultaneously controllable such that when said first RF switch is in said conducting state, said second RF switch is also in said conducting state.

16. The transmit/receive switch of claim 15, said second RF switch comprising a PIN diode.

17. The transmit/receive switch of claim 14, said fourth transmission line segment third selected length being slightly less than one quarter wavelength.

18. The transmit/receive switch of claim 14, further comprising a second conductive earth connection node connected to ground and a fifth transmission line segment connected between said first RF switch connection node and said second conductive earth connection node, said fifth transmission line segment having a fifth selected length being approximately equal to an odd number of quarter wavelengths.

19. The transmit/receive switch of claim 18, said fifth transmission line segment fifth selected length being slightly less than one quarter wavelength.

20. The transmit/receive switch of claim 11, said first, second and third transmission line segments being configured as strip line segments.

21. The transmit/receive switch of claim 11, said first, second and third transmission line segments being configured as micro-strip segments.

22. The transmit/receive switch of claim 11, said first, second and third transmission line segments being configured as coaxial transmission line segments.

23. The transmit/receive switch of claim 11, said first, second and third transmission line segments being configured as wave guide segments.

24. An economical, compact, transmit/receive "RF in" switching component, comprising;
a transmitter output connection node and an antenna connection node; a first transmission line segment connected between said transmitter connection node and said antenna connection node and having a first selected electrical length of approximately one quarter wavelength;
a first semiconductor circuit element having control input node and a conducting state and a substantially non-conducting state and having a first semiconductor circuit element connection node;
a second transmission line segment connected between said transmitter connection node and a first semiconductor circuit element connection node;
said transmit/receive switch further comprising a third transmission line segment connected between said first semiconductor circuit element connection node and a grounded node and having a selected electrical length less than one quarter wavelength; and
said first semiconductor circuit element being selectively operable to effectively ground said third transmission line segment at said first semiconductor circuit element connection node when in said conducting state, in response to receiving a control signal on said control input node.

25. The economical, compact, transmit/receive "RF in" switching component of claim 24, wherein said first semiconductor circuit element comprises a PIN diode.

26. An economical, compact, transmit/receive "RF out" switching component, comprising;
a receiver input connection node and an antenna connection node;
a first transmission line segment connected between said receiver input connection node and said antenna connection node and having a first selected electrical length of approximately one quarter wavelength;
a first semiconductor circuit element having control input node and a conducting state and a substantially non-conducting state and having a first semiconductor circuit element connection node;
said first semiconductor circuit element connection node being connected to said receiver input connection node;
a second transmission line segment connected between said receiver input connection node and a grounded node and having a selected electrical length less than one quarter wavelength; and
said first semiconductor circuit element being selectively operable to effectively ground said second transmission line segment at said first semiconductor circuit element connection node when in said conducting state, in response to receiving a control signal on said control input node.

27. The economical, compact, transmit/receive "RF out" switching component of claim 26, wherein said first semiconductor circuit element comprises a PIN diode.

* * * * *